No. 714,984. Patented Dec. 2, 1902.
H. H. WING.
PROCESS OF MAKING MAGNESIUM SULFATE.
(Application filed Sept. 5, 1901.)
(No Model.)
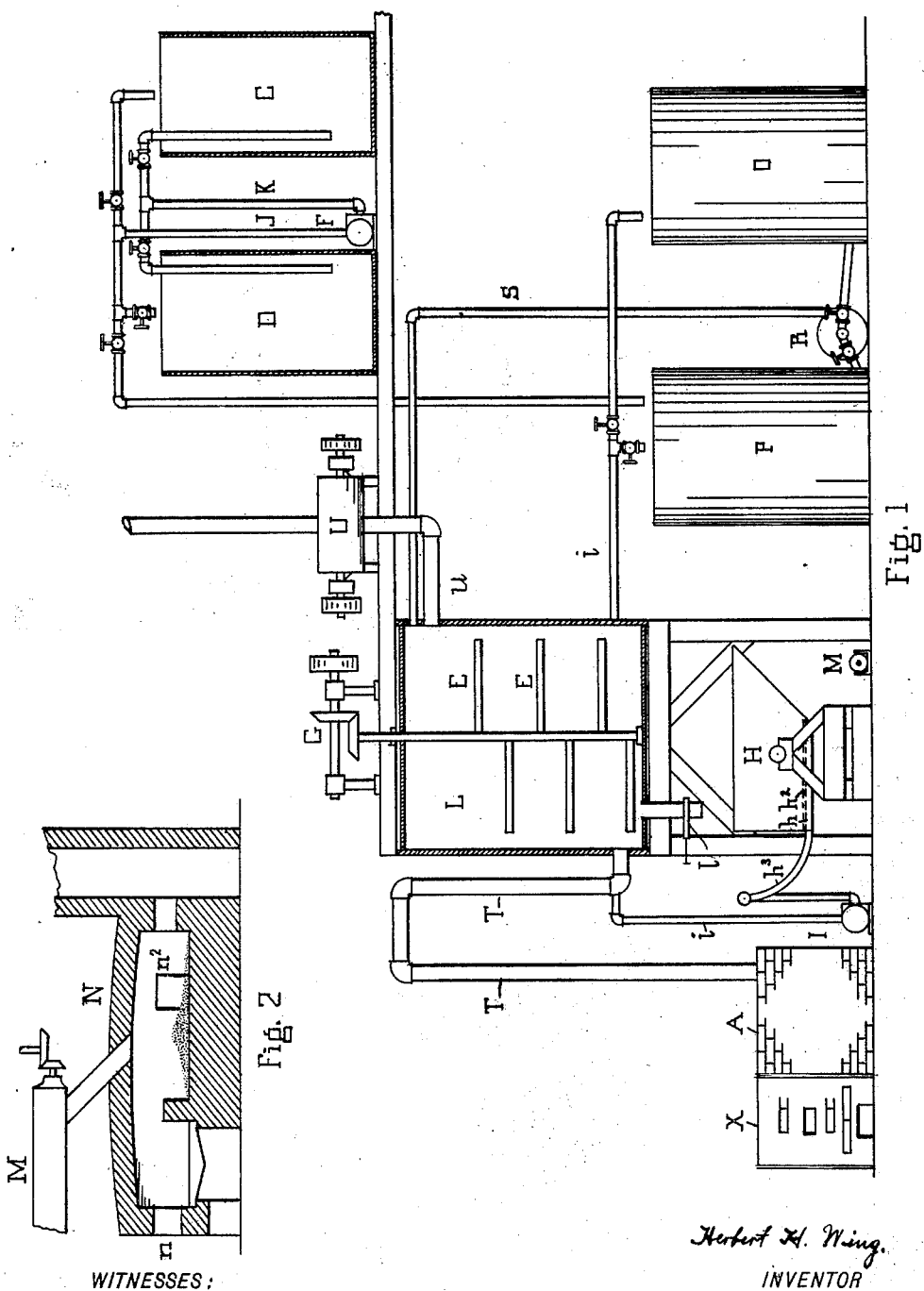
WITNESSES:
Geo. H. Gibson
Ernst Franké
INVENTOR
Herbert H. Wing.
BY
his ATTORNEY

UNITED STATES PATENT OFFICE.

HERBERT H. WING, OF NEW BRIGHTON, NEW YORK.

PROCESS OF MAKING MAGNESIUM SULFATE.

SPECIFICATION forming part of Letters Patent No. 714,984, dated December 2, 1902.

Application filed September 5, 1901. Serial No. 74,375. (No specimens.)

*To all whom it may concern:*

Be it known that I, HERBERT H. WING, a citizen of the United States, residing at New Brighton, in the county of Richmond and State of New York, have invented certain new and useful Improvements in Processes of Obtaining Magnesium Sulfate and By-Products; and I do hereby declare the following to be a full, clear, and exact description of the invention, such as will enable others skilled in the art to which it appertains to make and use the same.

The object of my invention is to utilize sulfur fumes in the production of chemicals in the place of other and more expensive chemicals which have hitherto always been used in the commercial production of such chemicals and also to use sulfur fumes which are too dilute for any other known purpose. The dilute sulfurous fumes (less than one per cent. $SO_2$) which I have used could not be applied for the manufacture of liquid sulfurous acid by absorbing these fumes in water and then expelling the pure gas by heat, as such dilute gases will not produce strong enough sulfurous-acid solutions to be thus used commercially.

In the drawings hereto attached, Figure 1 is an elevation, partly in section, of apparatus suitable for the carrying out of my invention; and Fig. 2 is a sectional elevation of a furnace which may be used in conjunction therewith.

By my process I am also able to use sulfur fumes which are contaminated with air or with air and carbonic-acid gas or with sulfuric-acid gas. Besides being able to use sulfur fumes, which are a waste product and often a great nuisance and in many cases have to be got rid of at great expense, the chemicals which I produce from such fumes are at present produced by expensive chemicals, such as sulfuric acid or sodium sulfate and calcium chlorid, carbonate of magnesia, and sulfuric acid, &c.

My process, in general terms, consists in first producing a mixture of the sulfite and sulfate of magnesium by bringing the sulfur fumes and air into contact in the presence of moisture with magnesia, magnesium hydrate, magnesium carbonate, or any compound of magnesium which is decomposable by sulfur dioxid in the presence of moisture. The proportion of sulfite and sulfate will depend on the amount of oxidizing that the sulfite undergoes from the amount of air brought into contact with it and also on the amount of sulfuric acid contained in the fumes and produced in the passage of the gases through the apparatus. The temperature also influences the result, the higher temperature increasing the amount of sulfates produced. By continuing to pass the fumes through the solution of the sulfates and at the same time adding fresh quantities of magnesia compounds the oxidizing of the sulfite formed (which being insoluble remains suspended in the solution) is increased, and these conditions for obtaining the sulfate can be regulated so that all or substantially all of the sulfite is converted into sulfate. In this case the solution is allowed to stand and the insoluble impurities settled out and the pure sulfate of magnesia obtained by crystallization. Instead of completing the oxidation of all the sulfite directly in the liquor the sulfite can be settled or filtered out and slightly heated in a drier or reverberatory furnace and exposed to an oxidizing atmosphere, when it will be very rapidly converted into sulfate. The sulfate thus produced is then added to water and dissolved, the insoluble impurities settled out, and the pure sulfate crystallized and recovered.

Instead of having the sulfate of magnesium the sole product of the utilization of the sulfur fumes, which necessitates the purchase of all the magnesium in some form decomposable by sulfur dioxid in the presence of moisture—such as oxid, hydrate, or carbonate— the cost of this item can be reduced by carrying out the following reactions: The whole or part of the sulfate of magnesium is brought into contact with a solution of calcium chlorid, whereby there is produced calcium sulfate and magnesium chlorid, according to the reaction $$MgSO_4 + CaCl_2 + XH_2O = CaSO_4, 2H_2O + MgCl_2 + H_2O.$$

The calcium sulfate, being practically insoluble, is precipitated, filtered, washed, and preferably dried, in which condition it is commercially known as "crown-filler or pearl-hardening." To the solution of magnesium chlorid I add lime or milk of lime, whereby there is produced magnesium hydrate and calcium chlorid. The magnesium hydrate being insoluble, it is precipitated, and the liquor containing the calcium chlorid is then decanted. The magnesium hydrate thus produced can be used over again in the first step of the process, and the regenerated calcium chlorid can also be used over again in the third step of this process.

Instead of using lime containing only the oxid of calcium, as above mentioned, I can use lime obtained from dolomite, and therefore containing both calcium and magnesium oxids. When this kind of lime is used, more will be required, as only the calcium hydrate in the same acts on the magnesium chlorid; but the magnesium oxid in it will be converted into magnesium hydrate and will be obtained as such, along with the magnesium hydrate, from the magnesium chlorid, so that as much magnesium hydrate is obtained as a by-product as is contained in the dolomite lime. Wherever lime or dolomite lime is to be used, it may be used either in the form of lime or as milk of lime, as may be preferred, the milk of lime being in all respects equivalent to the lime in the reaction herein described. As the magnesium hydrate which is thus obtained is more valuable than calcined magnesia or magnesite at certain localities, the latter forms of magnesia may be used instead of the former for the first step of this process, in which case the final products will be all the magnesium hydrate from the calcined magnesia or magnesite and that of the dolomite lime and also the crown-filler or pearl-hardening, while the only materials which require to be purchased are calcined magnesia or magnesite and ordinary dolomite lime.

In case only a part of the magnesium sulfate was used to carry out the above-mentioned reaction the final products will be magnesium sulfate, all the magnesia of the magnesium sulfate used in the above reactions, and the corresponding amount of crown-filler or pearl-hardening, while the only materials which require to be purchased are calcined magnesia or magnesite and ordinary dolomite lime, and in case the magnesium hydrate produced was used for the first step of the process there would be less of it obtained as a final product, and thereby the necessity of buying any calcined magnesia or magnesite would be obviated, as the dolomite lime would be the only product to be bought and would furnish the necessary magnesia to produce the magnesium sulfate, which was not used in the subsequent reactions, beginning with the calcium chlorid, but which constituted one of the final products.

To carry out my process of utilizing sulfur fumes, a variety of different forms of apparatus may be used.

In the annexed drawings, which are elevations partly in section, I have shown in Fig. 1 a form of apparatus which is adapted for such work.

X represents a source from which fumes containing sulfur dioxid may be obtained and may be a smelting-furnace, ore-roaster, or any apparatus from which fumes containing sulfur dioxid can be obtained.

A represents a dust-collecting chamber for settling out any dust carried by the fumes.

T T represent pipes which convey the fumes to the absorbing apparatus L, which consists of a tank provided with means E for agitating the contents and mechanism G for operating the agitators E E.

H represents a receiving-tank, preferably mounted on trunnions and in which is provided a perforated false bottom $h$ and filtering material $h^2$. This tank is connected by suitable flexible connections $h^3$ to a pump I, whereby the liquid contents of tank H may be drained away from the solid matter, leaving the latter semidry.

M represents a trough or conveyer into which the drained contents of tank H may be emptied, as by tipping the same on its trunnions, and by which conveyer the contents of tank H may be conducted to any other desired apparatus—as, for instance, to a drier.

O represents a tank for crystallizing the magnesium sulfate, and P a tank for preparing the milk of magnesia or any compound of magnesium which in the presence of moisture is decomposable by sulfur dioxid.

R represents a pump for forcing the magnesium emulsion from tank P into the absorbing apparatus L.

S is a pipe connecting the pump R with the absorbing apparatus L.

D and C are tanks for treating the magnesium sulfate and the magnesium chlorid.

F is a pump, and K and J are inlet and outlet pipes to said pump, by means of which the liquid contents of tanks C and D may be transferred from one to the other or to the tank P.

The method of operating the apparatus shown in the drawings consists in first passing the sulfur fumes containing $SO_2$ with some air and more or less $SO_3$ from the source X through the dust-settling chamber A, then through pipes T T and the absorbing apparatus L, through which they are drawn by by pipe $u$ by means of the suction maintained by the suction-blower U. The absorbing apparatus L is nearly filled with an emulsion of magnesium hydrate or of any compound of magnesium which in the presence of moisture is decomposable by sulfur dioxid, which is prepared in the tank P and delivered to the absorber L by the pump R through the pipe S. The emulsion is kept agitated by means of the agitators E E and mechanism G, which is continuously operated. By passing the sulfur fumes containing air into the emulsion of magnesium hydrate or any other compound of magnesium which in the presence of moisture is decomposable by sulfur dioxid, the monosulfite and sulfate of magnesium are produced, the proportion of sulfate increasing according to the amount of $SO_3$, the amount of air in the fumes, the length of time the fumes are drawn through the liquor, and the temperature of the same; until in time all the monosulfite can be oxidized to sulfate as before stated. Instead of oxidizing all the monosulfite first produced in the liquor, the passage of the fumes is preferably continued only until all the magnesia contained in the liquor is neutralized and thereby converted into monosulfite and sulfate, which can be ascertained by testing the liquor for acid or alkaline reaction. The valve $l$ in the discharge pipe of tank L is then opened and the contents of the absorber are discharged into the filter tank H. The monosulfite of magnesium is a whitish granular mud, from which a part of the water is drained by drawing it through the filter and perforated bottom of the tank H by the pump I, leaving a semi-dry mass in the tank. The monosulfite of magnesium is removed from the tank H and is exposed to heat in a drier or furnace, in an oxidizing atmosphere, whereby the monosulfite is converted into sulfate. For this purpose a furnace such as shown in Fig. 2 may be employed, in which N represents a reverberatory furnace to which the sulfite may be conveyed by any suitable means, such for instance as the conveyer M, and in which furnace the material is heated and subjected to the action of air admitted in any suitable manner, as through the door or opening $n_2$, and the charge may be stirred if need be through the opening $n$, through which then converted to sulfate the charge may also be withdrawn. The solution passing through the filter in H is forced by the pump I through the pipe $i$ into the tank O, where it is allowed to remain and the magnesium sulfate in solution is crystallized out. The sulfate produced in the drier or furnace is placed in the tank H, and sufficient hot water is added to it to dissolve the sulfate, producing a concentrated solution, then the pump I is started and the clear solution of magnesium sulfate is pumped into the tank O and allowed to crystallize with the first portion of magnesium sulfate. The insoluble impurities in the monosulfite are left on the filter in H and are then removed. The mother liquors left from crystallizing the magnesium sulfate can be used to make up the emulsions in the tank P until they are used so often as to contain too great an amount of impurities, when fresh water is used in place of the impure mother liquors which are thrown away.

The crystallized magnesium sulfate obtained by the above method is then added to a solution of calcium chlorid contained in the tank D, whereby calcium sulfate ($CaSO_4, 2H_2O$) and a solution of magnesium chlorid ($MgCl_2$) are produced, as before described. The insoluble calcium sulfate is separated from the solution, washed and preferably dried, in which condition it is known in the market as crown filler or pearl hardening. The solution of magnesium chlorid which is produced as above stated, is forced by the pump F into the tank C. Into this solution lime, or as an equivalent milk of lime, is added, whereby calcium chlorid is regenerated (which can be used over again), and magnesium hydrate is produced, which being insoluble, is precipitated. The calcium chlorid solution is pumped back into the tank D, and the flocculent magnesium hydrate precipitate is then pumped to the tank P, from which it is forced into the absorber L to be used over again, or it may be washed and dried, or made into carbonate and dried, or used to make any of the marketable forms in which magnesia is found. Instead of using lime containing only calcium oxid in the tank C, dolomite lime or milk of lime from the same can be used, which as before mentioned requires more lime but the magnesium which it contains forms the hydrate when slaked and increases the total amount of magnesium hydrate precipitated in that tank, it is therefore to be understood that in my process and as a part of my invention the use of dolomite lime as an equivalent for ordinary lime is included, and that the term lime is used to include both species of lime and the use of either as may be preferred.

Whenever the "sulfur fumes" are mentioned as containing sulfur dioxid and air I do not desire to exclude the presence of the sulfur trioxid, which will vary according to the source from which the fumes are obtained, and which as before mentioned can be a constituent of the fumes which I use in this process; the designation of the mixture of sulfur dioxide and air is mentioned because without the air being present, the sulfite could not be converted into sulfate in the subsequent steps.

What I claim is:

1. The herein described process of obtaining magnesium sulfate which consists in subjecting any compound of magnesium decomposable by sulfur dioxid in the presence of moisture to the action of sulfur fumes containing sulfur dioxid and air, in the presence of moisture, whereby the sulfite and sulfate of magnesium are produced, then exposing such mixture of sulfite and sulfate to oxidizing conditions, whereby the sulfite is converted into sulfate.

2. The herein described process of obtaining magnesium sulfate which consists in subjecting any compound of magnesium decomposable by sulfur dioxid in the presence of moisture to the action of sulfur fumes containing sulfur dioxid and air in the presence of moisture whereby the sulfite and sulfate of magnesium are produced, then continuing the action of said fumes until all the sulfite of the mixture is converted into sulfate.

3. The herein described process of obtaining magnesium sulfate which consists in subjecting any compound of magnesium decomposable by sulfur dioxid in the presence of moisture, to the action of sulfur fumes containing sulfur dioxid and air in the presence of moisture, whereby the sulfite and sulfate of magnesium are produced, then exposing such mixture of sulfite and sulfate to oxidizing conditions, whereby the sulfite is converted into sulfate, then crystallizing out the magnesium sulfate from a solution of the same in water.

4. The herein described process of obtaining magnesium sulfate which consists in subjecting magnesium hydrate to the action of sulfur fumes containing sulfur dioxid and air whereby the sulfite and sulfate of magnesium are produced, then continuing the action of said fumes until all the sulfite of the mixture is converted into sulfate, then crystallizing out the magnesium sulfate from a solution of the same in water.

5. The herein described process of obtaining magnesium sulfate which consists in subjecting any compound of magnesium decomposable by sulfur dioxid in the presence of moisture to the action of sulfur fumes containing sulfur dioxid and air in the presence of moisture, whereby the sulfite and sulfate of magnesium are produced, then separating the soluble sulfate in water from the insoluble sulfite, subsequently crystallizing out the magnesium sulfate, then exposing the sulfite to oxidizing conditions whereby the sulfite is converted into sulfate.

6. The herein described process of obtaining magnesium sulfate which consists in subjecting any compound of magnesium decomposable by sulfur dioxid in the presence of moisture to the action of sulfur fumes containing sulfur dioxid and air in the presence of moisture, whereby the sulfite and sulfate of magnesium are produced, then separating the soluble sulfate in water from the insoluble sulfite, subsequently crystallizing out the magnesium sulfate, then exposing the sulfite to oxidizing conditions whereby the sulfite is converted into sulfate, then crystallizing out the magnesium sulfate from the solution of the same in water.

7. The herein described process of obtaining magnesium sulfate and a by-product which consists in subjecting any compound of magnesium decomposable by sulfur dioxid in the presence of moisture, to the action of sulfur fumes containing sulfur dioxid and air in the presence of moisture, whereby the sulfite and sulfate of magnesium are produced, then separating the soluble sulfate in water from the insoluble sulfite, then exposing the sulfite to oxidizing conditions, whereby the sulfite is converted into sulfate, then adding the sulfate to a solution of calcium chlorid whereby magnesium chlorid and calcium sulfate are produced, then separating the insoluble calcium sulfate from the liquor in which it was produced, then adding lime to the magnesium chlorid which remains in solution in said liquor whereby calcium chlorid and the by-product magnesium hydrate are produced.

8. The herein described process of obtaining magnesium sulfate and a by-product which consists in subjecting any compound of magnesium decomposable by sulfur dioxid in the presence of moisture, to the action of sulfur fumes containing sulfur dioxid and air in the presence of moisture, whereby the sulfite and sulfate of magnesium are produced, then separating the soluble sulfate in water from the insoluble sulfite, then exposing the sulfite to oxidizing conditions, whereby the sulfite is converted into sulfate, then adding the sulfate to a solution of calcium chlorid whereby magnesium chlorid and calcium sulfate are produced, then separating the insoluble calcium sulfate from the liquor in which it was produced, then adding calcium hydrate to the magnesium chlorid which remains in solution in said liquor, whereby calcium chlorid and the by-product magnesium hydrate are produced.

9. The herein described process of obtaining magnesium sulfate and by products which consists in subjecting any compound of magnesium decomposable by sulfur dioxid in the presence of moisture, to the action of sulfur fumes containing sulfur dioxid and air in the presence of moisture, whereby the sulfite and sulfate of magnesium are produced, then exposing such mixture of sulfite and sulfate to oxidizing conditions whereby the sulfite is converted into sulfate, then adding a portion of said sulfate to a solution of calcium chlorid whereby magnesium chlorid and the by product calcium sulfate are produced, then separating the insoluble calcium sulfate from the liquor in which it was produced, then adding calcium hydrate to the magnesium chlorid which remained in solution in said liquor, whereby calcium chlorid and magnesium hydrate are produced.

10. The herein described process of obtaining magnesium sulfate and by products which consists in subjecting any compound of magnesium decomposable by sulfur dioxid in the presence of moisture, to the action of sulfur fumes containing sulfur dioxid and air in the presence of moisture, whereby the sulfite and sulfate of magnesium are produced, then continuing the action of said fumes until the sulfite of the mixture is converted into sulfate, then adding a portion of said sulfate to a solution of calcium chlorid whereby magnesium chlorid and the by product calcium sulfate are produced, then separating the insoluble calcium sulfate from the liquor in which it was produced, then adding calcium hydrate to the magnesium chlorid which remains in solution in said liquor whereby magnesium hydrate and calcium chlorid are produced.

11. The herein described process of obtaining magnesium sulfate and by products which consists in subjecting any compound of magnesium decomposable by sulfur dioxid in the presence of moisture, to the action of sulfur fumes containing sulfur dioxid and air in the presence of moisture, whereby the sulfite and sulfate of magnesium are produced, then continuing the action of said fumes until the sulfite of the mixture is converted into sulfate, then adding a portion of said sulfate to a solution of calcium chlorid whereby magnesium chlorid and the by product calcium sulfate are produced, then separating the insoluble calcium sulfate from the liquor in which it was produced, then adding calcium hydrate to the magnesium chlorid which remains in solution in said liquor whereby magnesium hydrate and calcium chlorid are produced, then separating the magnesium hydrate from the solution of calcium chlorid.

12. The herein described process of obtaining magnesium sulfate and a by product which consists in subjecting any compound of magnesium decomposable by sulfur dioxid in the presence of moisture, to the action of sulfur fumes containing sulfur dioxid and air in the presence of moisture, whereby sulfite and sulfate of magnesium are produced, then separating the soluble sulfate in water from the insoluble sulfite, then exposing the sulfite to oxidizing conditions whereby the sulfite is converted into sulfate, then adding a portion of said sulfate to a solution of calcium chlorid whereby magnesium chlorid and the by product calcium sulfate are produced, then separating the insoluble calcium sulfate from the liquor in which it was produced, then adding lime or milk of lime to the magnesium chlorid which remains in solution in said liquor, whereby magnesium hydrate and calcium chlorid are produced.

In testimony whereof I hereto affix my signature, in presence of two witnesses.

HERBERT H. WING.

Witnesses:
T. H. SPRATT,
F. I. RIEFF.